United States Patent [19]
Price

[11] Patent Number: 5,636,669
[45] Date of Patent: Jun. 10, 1997

[54] SELECTIVE COLORING SYSTEM

[76] Inventor: Kevin A. Price, 800 Park Ridge Rd., apt A1, Durham, N.C. 27713

[21] Appl. No.: 514,262

[22] Filed: Aug. 11, 1995

[51] Int. Cl.[6] ...................................................... B65B 1/04
[52] U.S. Cl. ................... 141/104; 40/406; 40/591
[58] Field of Search .................... 141/100, 104, 141/105, 65, 98, 9; 296/194; 40/406, 591, 409

[56] References Cited

U.S. PATENT DOCUMENTS

| | | | |
|---|---|---|---|
| 3,349,815 | 10/1967 | Baets | 141/104 |
| 3,440,129 | 4/1969 | Anselm | 161/5 |
| 3,461,584 | 8/1969 | Wilson | 40/591 |
| 3,638,342 | 2/1972 | Winslow et al. | 40/406 |
| 3,709,770 | 1/1973 | Hale | 161/44 |
| 3,935,353 | 1/1976 | Doerfling et al. | 296/137 R |
| 4,033,619 | 7/1977 | Cox | 296/21 |
| 4,144,663 | 3/1979 | Saenger et al. | 40/406 |
| 5,340,623 | 8/1994 | Menjo et al. | 40/591 |

*Primary Examiner*—Henry J. Recla
*Assistant Examiner*—Steven O. Douglas
*Attorney, Agent, or Firm*—Michael I. Kroll

[57] ABSTRACT

A selective coloring system comprising a hollow transparent panel. A plurality of separate different colored materials are provided. A facility is for forcing one of the separate different colored materials into and ut of the hollow transparent panel, so as to change the appearance of the hollow transparent panel for aesthetic reasons when the need arises.

17 Claims, 3 Drawing Sheets

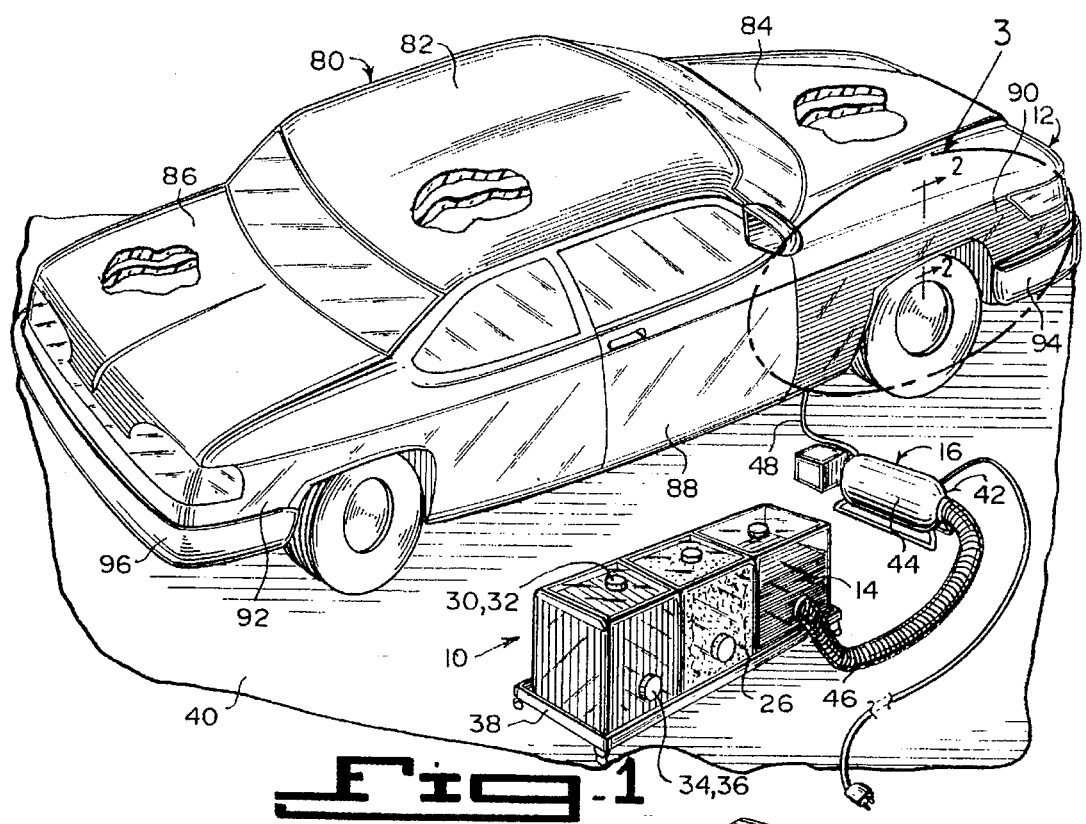
Fig-1
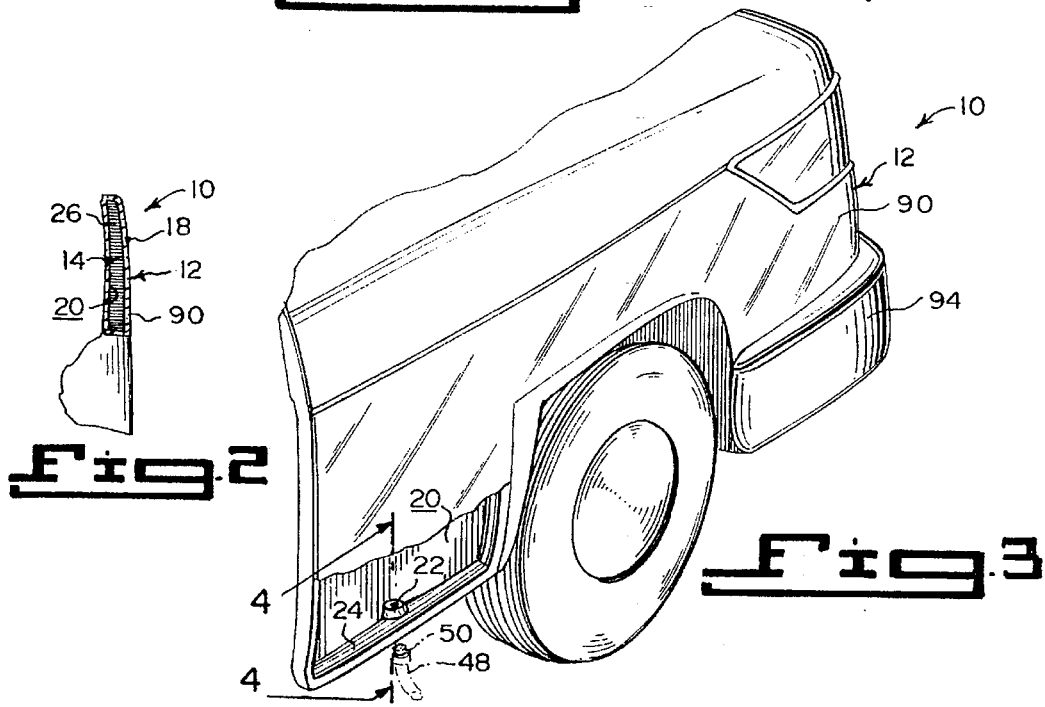
Fig-2
Fig-3

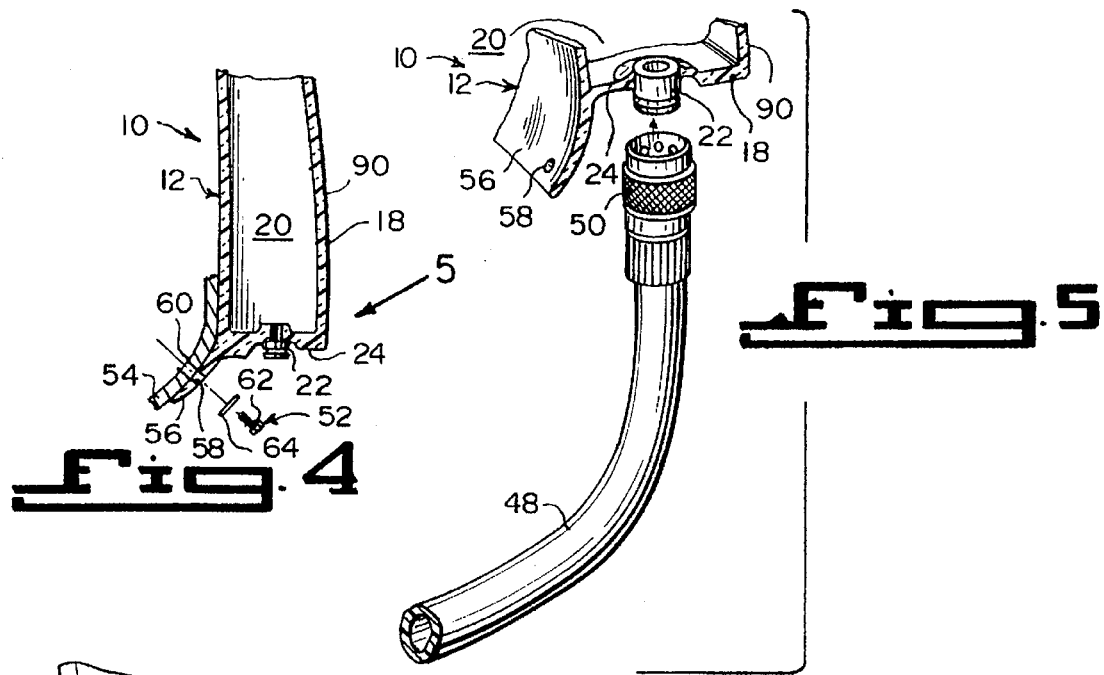
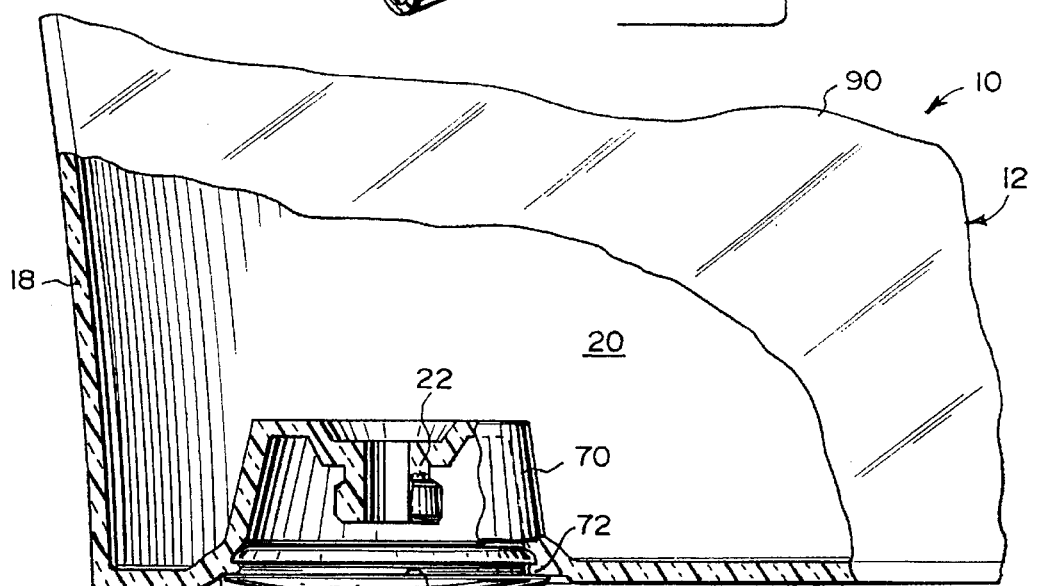
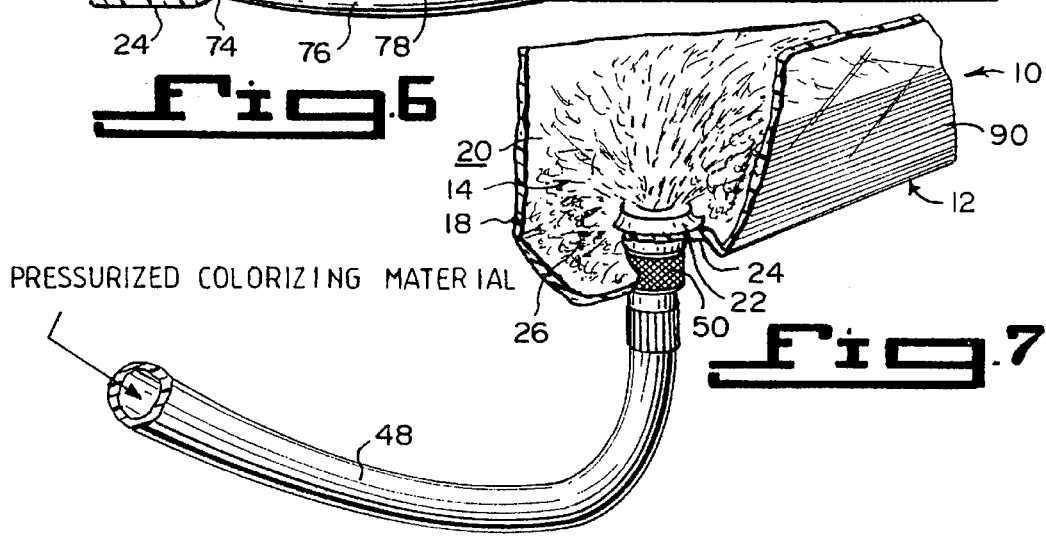

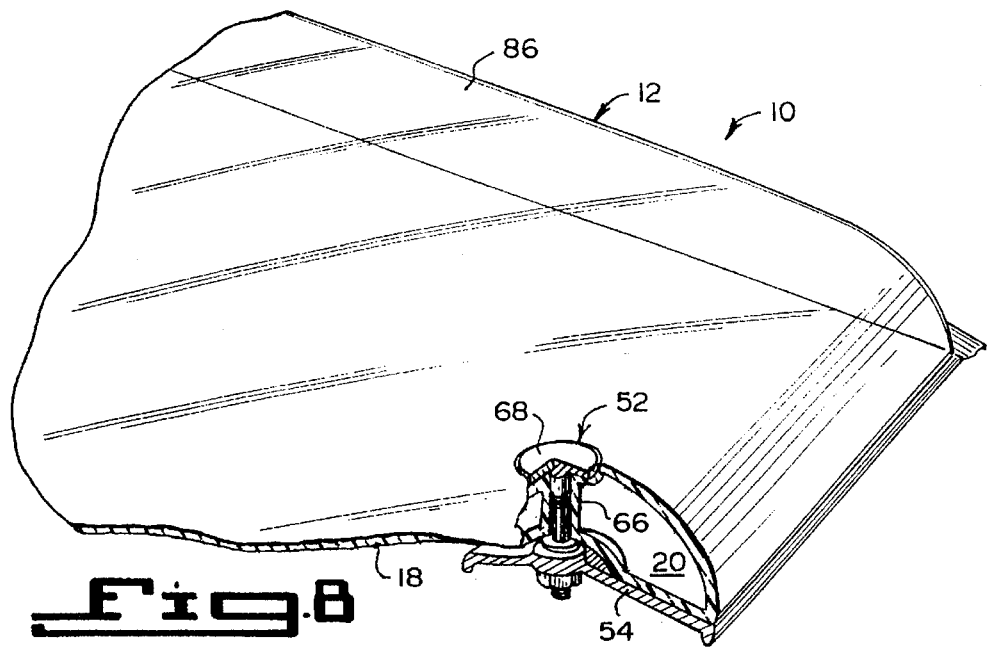

Fig. 8

COLORIZATION PROCESS
(INITIAL APPLICATION)

1 — CONNECT VACUUM / PRESSURIZATION SOURCE TO RESERVOIR CONTAINING DESIRED COLORIZING MATERIAL.
2 — CONNECT APPLICATION HOSE TO PANEL CAVITY
3 — PRESSURIZE COLORIZATION MATERIAL AND INTRODUCE INTO PANEL UNTIL PANEL CAVITY IS FILLED WITH COLORIZING MATERIAL.
4 — DEACTIVATE PRESSURIZATION AND DISSCONNECT APPLICATION HOSE
5 — REPEAT STEPS FOR ADDITIONAL PANELS AS REQUIRED

SUBSEQUENT APPLICATIONS TO CHANGE COLOR

1A — FOLLOW STEPS 1 AND 2 ABOVE
2A — ACTIVATE VACUUM SOURCE TO EXTRACT COLORIZING MATERIAL FROM PANEL CAVITY AND WHEN EXTRACTION IS COMPLETED PROCEED WITH STEPS 3, 4 AND 5 AS REQUIRED.

Fig. 9

SELECTIVE COLORING SYSTEM

BACKGROUND OF THE INVENTION

1. Field of The Invention

The instant invention relates generally to decorative covering materials and more specifically it relates to a selective coloring system.

2. Description of the Prior Art

Numerous decorative covering materials have been provided in prior art. For example, U.S. Pat. No. 3,440,129 to Anselm; U.S. Pat. No. 3,709,770 to Hale and U.S. Pat. No. 4,033,619 to Cox all are illustrative of such prior art. While these units may be suitable for the particular purpose to which they address, they would not be as suitable for the purposes of the present invention as heretofore described.

Anselm, Anthony Cesar

Decorative Plastic Extrusions

U.S. Pat. No. 3,440,129

A decorative plastic extrusion comprising an extruded plastic core. A metal-plastic foil laminate is bonded to the surface of the core. The core with the foil laminate bonded thereto forms an insert in an extrusion of transparent or translucent plastic material which forms a protective layer over the foil laminate which is seen through the front face of the decorative plastic extrusion.

Hale, Clifford E.

Decorative Exterior Panel System For Automobiles

U.S. Pat. No. 3,709,770

Trim panel structures are disclosed of the character adapted to be mounted on the exterior surfaces of vehicle panels such as fender, door, quarter and tailgate panels of a station wagon, to provide the vehicle exterior with a wood panel and border appearance. Each trim panel is defined by a sheet of thermoplastic material formed to define internal panel and border portions having decorable outer surfaces. The outer periphery of the trim panel corresponds in contour generally to the outer periphery of the vehicle panel to which it is to be attached. A decorative means is applied to the decorable outer surfaces of the panel and border portions, to provide for the panel portion to have a wood panel appearance and to provide for the border portion to have a wood grained appearance contrasting in color with the panel portion.

Cox, Diane M.

Transparent Tailgate For Station Wagons and Pickup Trucks

U.S. Pat. No. 4,033,619

A transparent panel with the manufacturer's name embedded therein in a tailgate to improve the rear vision of the driver and for safety. The transparent panel may be one-way glass.

SUMMARY OF THE INVENTION

A primary object of the present invention is to provide a selective coloring system that will overcome the shortcomings of the prior art devices.

Another object is to provide a selective coloring system, in which hollow transparent panels are utilized to be injected and extracted with various colored materials by a vacuum source, so as to change the appearances of the panels when the need arises.

An additional object is to provide a selective coloring system, in which the colored materials are lightweight powdered or shredded substances and since no paint is used, there will be no fading, chipping and waste removal, thereby being environmentally safe.

A further object is to provide a selective coloring system that is simple and easy to use.

A still further object is to provide a selective coloring system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view with parts broken away and in section of the instant invention built into an automobile.

FIG. 2 is a cross sectional view taken along line 2–2 in FIG. 1.

FIG. 3 is an enlarged perspective view with parts broken away as indicated by arrow 3 in FIG. 1.

FIG. 4 is a cross sectional view taken along line 4–4 in FIG. 3.

FIG. 5 is a cross sectional perspective view taken in the direction of arrow 5 in FIG. 4, showing the connector of the application hose ready to be connected to the fitting.

FIG. 6 is an enlarged front view with parts broken away and in section as indicated by arrow 6 in FIG. 3, showing a recessed fitting and cover plug therein.

FIG. 7 is a perspective view with parts broken away and in section, showing the connector connected to the fitting with the pressurized colorizing material being forced within the hollow transparent panel.

FIG. 8 is a perspective view with parts broken away and in section, showing a clamp assembly for retaining the hollow transparent panel to the chassis of the automobile.

FIG. 9 is a chart showing the colorization process and subsequent applications to change color.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 8 illustrate a selective coloring system 10, comprising a hollow transparent panel 12. A plurality of separate different colored materials 14 are provided. A facility 16 is for forcing one of the separate different colored materials 14 into and out of the hollow transparent panel 12, so as to change the appearance of the hollow transparent panel 12, for aesthetic reasons when the need arises.

The hollow transparent panel 12 is fabricated out of plastic 18. The hollow transparent panel 12 has an enclosed cavity 20, to receive the colored materials 14 from the forcing facility 16. A fitting 22 is on a bottom end 24 of the hollow transparent panel 12 thereof, for connection to the forcing facility 16. The colored materials 14 are made out of lightweight powdered or shredded substances 26.

The selective coloring system 10, as shown in FIG. 1, further includes a plurality of containers 28, in which each container 28 will hold one of the different colored materials 14. Each container 28 contains a filler neck 30, so that the colored materials 14 can be placed into the container 28. A first cap 32 fits onto the filler neck 30, so as to seal closed the filler neck 30 when not in use.

Each container 28 also includes an extractor neck 34, so that the colored materials 14 can be removed from the container 28 by the forcing facility 16. A second cap 36 fits onto the extractor neck 34, so as to seal closed the extractor neck 34 when not in use. A cart 38 is provided for the containers 28 to sit into. The container 28 can be transported by the cart 38 along a flat horizontal surface 40, from place to place.

The forcing facility 16 is a pressurization source 42. The pressurization source 42 is a reversible vacuum unit 44. The reversible vacuum unit 44 contains a flexible tube 46 connected to the extractor neck 34 on one container 28. An application hose 48 is provided. A coupler 50, as best seen in FIGS. 5 and 7, is affixed to a distal end of the application hose 48. The coupler 50 can engage with the fitting 22 on the bottom end 24 of the hollow transparent panel 12.

Components 52 are for attaching the hollow transparent panel 12 to a chassis 54. The attaching components 52, as shown in FIG. 4, consists of a flange 56 extending from the bottom end 24 of the hollow transparent panel 12. The flange 56 has a hole 58 therethrough in alignment with an aperture 60 in the chassis 54. A mounting screw 62 threads into the hole 58 in the flange 56 and into the aperture 60 in the chassis 54. A washer 64 fits between the flange 56 and the mounting screw 62.

The attaching components 52 in FIG. 8, consists of the hollow transparent panel 12 having a sealed opening 66 therethrough. A clamp assembly 68 is for retaining the hollow transparent panel 12 to the chassis 54, via the sealed opening 66.

As shown in FIG. 6, the bottom end 24 of the hollow transparent panel 12 has a recessed truncated conical cup 70 about the fitting 22. An annular bead 72 is formed about a mouth 74 of the cup 70. A flexible plug 76 is provided, having an annular groove 78 to engage with the annular bead 72. The flexible plug 76 will seal off the mouth 74 of the cup 70, to prevent dirt and debris from entering the fitting 22, when the fitting 22 is not being used.

The selective coloring system 10, as shown in FIGS. 1 through 8, is applied to an automobile 80. Typically, the hollow transparent panel 12, which receives the colored materials 14 can be a:

a) roof 82,
b) hood 84,
c) trunk lid 86,
d) door 88,
e) front fender 90,
f) rear fender 92,
g) front bumper 94 and
h) rear bumper 96.

The selective coloring system 10 can also be used in home appliances and household furniture, not sown in the drawings. Typically, the hollow transparent panel 12, which receives the colored materials 14 can be in a:

a) refrigerator,
b) stove,
c) dishwasher,
d) freezer,
e) washing machine,
f) clothes dryer,
g) table top and
h) cabinet.

LIST OF REFERENCE NUMBERS 10 selective coloring system
12 hollow transparent panel
14 colored materials
16 forcing facility
18 plastic for 12
20 enclosed cavity in 12
22 fitting on 24
24 bottom end of 12
26 lightweight powdered or shredded substances for 14
28 container
30 filler neck on 28
32 first cap on 30
34 extractor neck on 28
36 second cap on 34
38 cart
40 flat horizontal surface
42 pressurization source for 16
44 reversible vacuum unit for 42
46 flexible tube of 44
48 application hose
50 coupler on 48
52 attaching components
54 chassis
56 flange on 24
58 hole in 56
60 aperture in 54
62 mounting screw
64 washer
66 sealed opening in 12
68 clamp assembly
70 recessed truncated conical cup on 24 about 22
72 annular bead on 74
74 mouth of 70
76 flexible plug
78 annular groove in 76
80 automobile
82 roof of 80
84 hood of 80
86 trunk lid of 80
88 door of 80
90 front fender of 80
92 rear fender of 80
94 front bumper of 80
96 rear bumper of 80

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A selective coloring system comprising:
    a) a hollow transparent panel;
    b) a plurality of separate different colored materials;
    c) means for forcing one of said separate different colored materials into and out of said hollow transparent panel, so as to change the appearance of said hollow transparent panel for aesthetic reasons when the need arises and
    d) means for attaching said hollow transparent panel to a vehicle chassis.

2. A selective coloring system comprising:
    a) a hollow transparent panel;
    b) a plurality of separate different colored materials;
    c) means for forcing one of said separate different colored materials into and out of said hollow transparent panel, so as to change the appearance of said hollow transparent panel for aesthetic reasons when the need arises;
    d) a plurality of containers, in which each said container will hold one of said different colored materials; and
    e) a cart for said containers to sit into, so that said containers can be transported along a flat horizontal surface from place to place.

3. A selective coloring system as recited in claim 2, wherein said pressurization source is a reversible vacuum unit.

4. A selective coloring system as recited in claim 3, wherein said reversible vacuum unit includes:
    a) a flexible tube connected to said extractor neck on one said container;
    b) an application hose; and
    c) a coupler affixed to a distal end of said application hose, so that said coupler can engage with a fitting on a bottom end of said hollow transparent panel.

5. A selective coloring system as recited in claim 1, further including means for attaching said hollow transparent panel to a chassis.

6. A selective coloring system as recited in claim 1, wherein said attaching means includes:
    a) a flange extending from a bottom end of said hollow transparent panel, said flange having a hole therethrough in alignment with an aperture in the chassis;
    b) a mounting screw to thread into said hole in said flange and into the aperture in said chassis; and
    c) a washer to fit between said flange and said mounting screw.

7. A selective coloring system as recited in claim 1, wherein said attaching means includes:
    a) said hollow transparent panel having a sealed opening therethrough; and
    b) a clamp assembly for retaining said hollow transparent panel to said chassis via said sealed opening.

8. A selective coloring system as recited in claim 1, further including:
    a) said bottom end of said hollow transparent panel having a recessed truncated conical cup about said fitting;
    b) an annular bead formed about a mouth of said cup;
    c) a flexible plug having an annular groove to engage with said annular bead, so that said flexible plug will seal off said mouth of said cup, to prevent dirt and debris from entering said fitting when said fitting is not being used.

9. A selective coloring system comprising:
    a) a hollow transparent panel fabricated out of plastic and having an enclosed cavity and a fitting on a bottom end thereof;
    b) a plurality of separate different colored materials made out of lightweight powdered/shredded substances;
    c) means for forcing one of said separate different colored materials into and out of said cavity in said hollow transparent panel, so as to change the appearance of said hollow transparent panel for aesthetic reasons when the need arises, said forcing means connected to said fitting; and
    d) a plurality of containers, in which each said container will hold one of said different colored materials, each said container including:
        i) a filler neck, so that said colored materials can be placed into said container;
        ii) a first cap to fit onto said filler neck, so as to seal closed said filler neck when not in use;
        iii) an extractor neck, so that said colored materials can be removed from said container by said forcing means; and
        iv) a second cap to fit onto said extractor neck, so as to seal closed said extractor neck when not in use.

10. A selective coloring system as recited in claim 9, further including a cart for said containers to sit into, so that said containers can be transported along a flat horizontal surface from place to place.

11. A selective coloring system as recited in claim 10, wherein said forcing means is a pressurization source.

12. A selective coloring system as recited in claim 11, wherein said pressurization source is a reversible vacuum unit.

13. A selective coloring system as recited in claim 12, wherein said reversible vacuum unit includes:
    a) a flexible tube connected to said extractor neck on one said container;
    b) an application hose; and
    c) a coupler affixed to said distal end of said application hose, so that said coupler can engage with said fitting on said bottom end of said hollow transparent panel.

14. A selective coloring system as recited in claim 13, further including means for attaching said hollow transparent panel to a chassis.

15. A selective coloring system as recited in claim 14, wherein said attaching means includes:
    a) a flange extending from said bottom end of said hollow transparent panel, said flange having a hole therethrough in alignment with an aperture in the chassis;
    b) a mounting screw to thread into said hole in said flange and into the aperture in said chassis; and
    c) a washer to fit between said flange and said mounting screw.

16. A selective coloring system as recited in claim 15, wherein said attaching means includes:
    a) said hollow transparent panel having a sealed opening therethrough; and b) a clamp assembly for retaining said hollow transparent panel to said chassis via said sealed opening.

17. A selective coloring system as recited in claim 16, further including:
   a) said bottom end of said hollow transparent panel having a recessed truncated conical cup about said fitting;
   b) an annular bead formed about a mouth of said cup;
   c) a flexible plug having an annular groove to engage with said annular bead, so that said flexible plug will seal off said mouth of said cup, to prevent dirt and debris from entering said fitting when said fitting is not being used.

* * * * *